July 30, 1935.  W. H. EWEND  2,009,579
VEHICLE STORAGE DEVICE
Original Filed Nov. 5, 1930  4 Sheets-Sheet 1
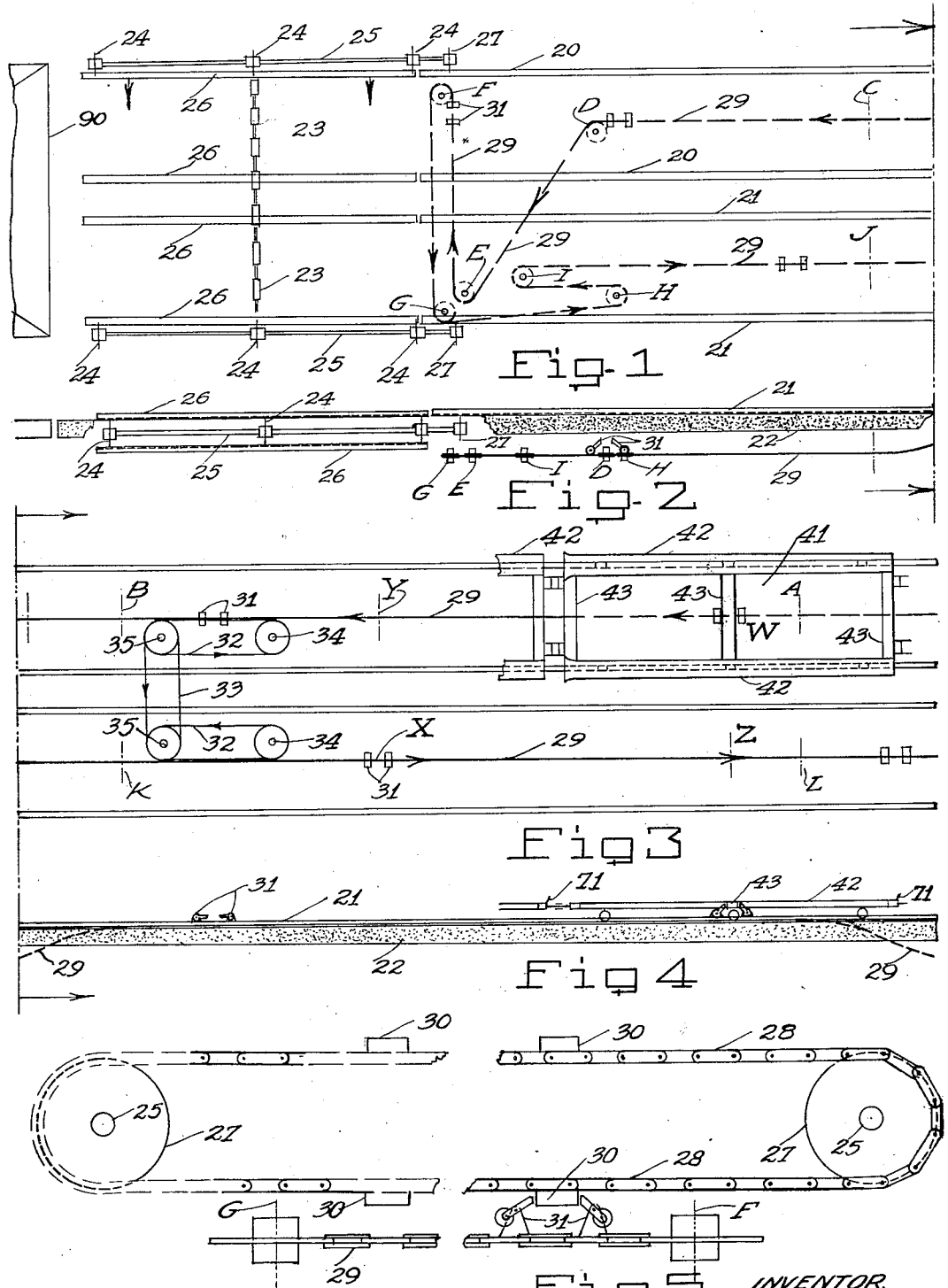
INVENTOR.
Walter H. Ewend.
By Edw. A. Hampson
Atty.

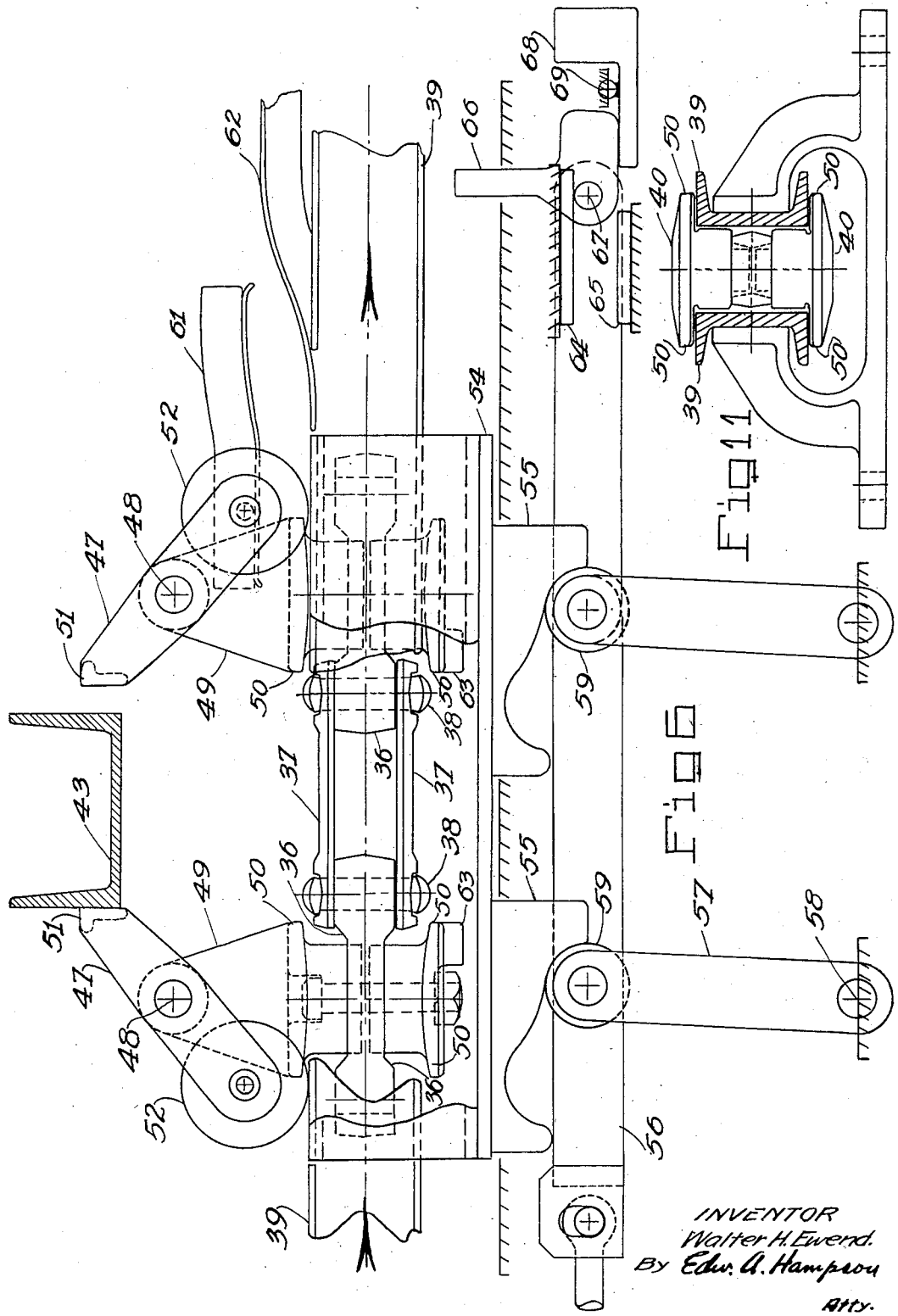

July 30, 1935.  W. H. EWEND  2,009,579
VEHICLE STORAGE DEVICE
Original Filed Nov. 5, 1930   4 Sheets-Sheet 3
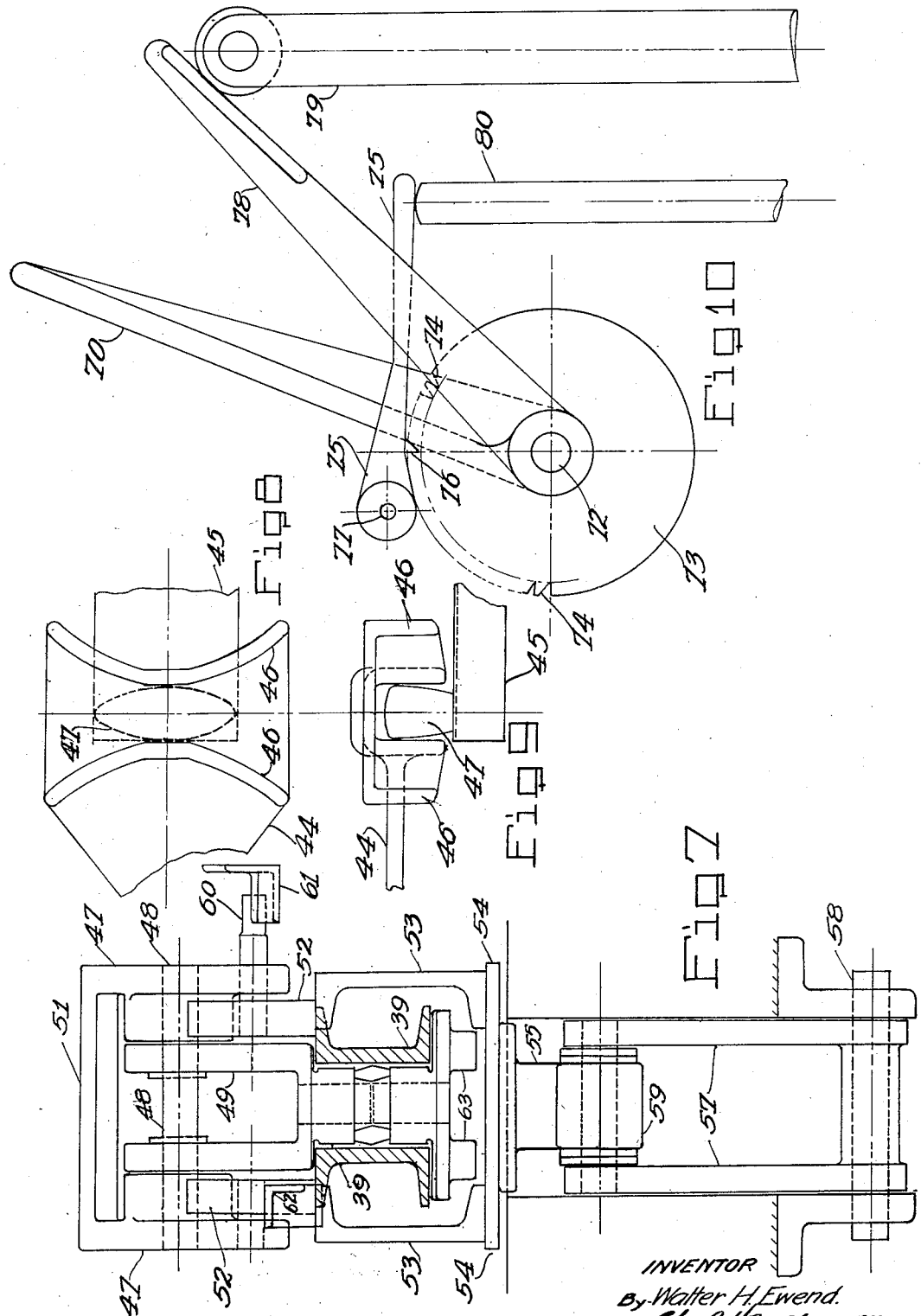

July 30, 1935.　　　　W. H. EWEND　　　　2,009,579
VEHICLE STORAGE DEVICE
Original Filed Nov. 5, 1930　　　4 Sheets-Sheet 4
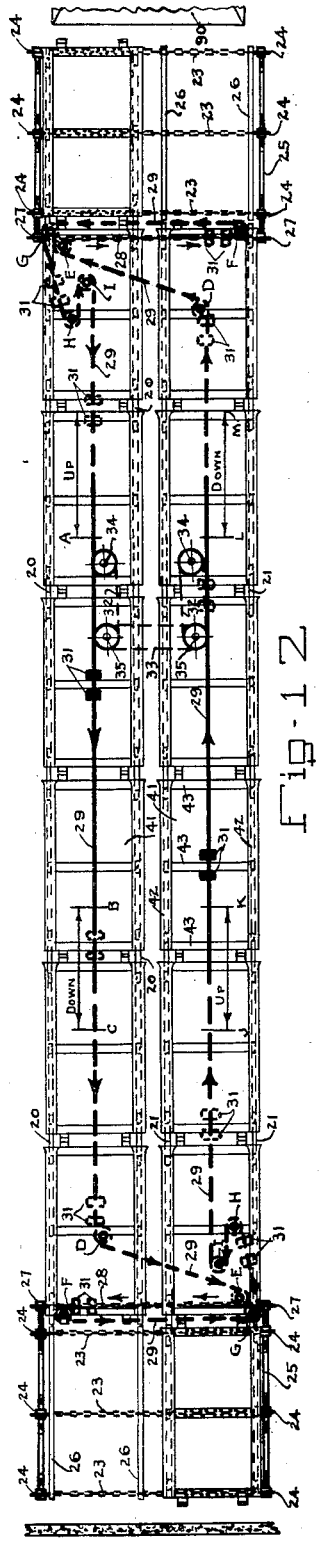
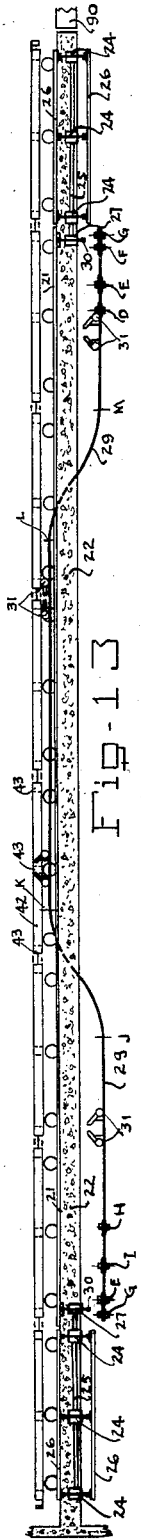
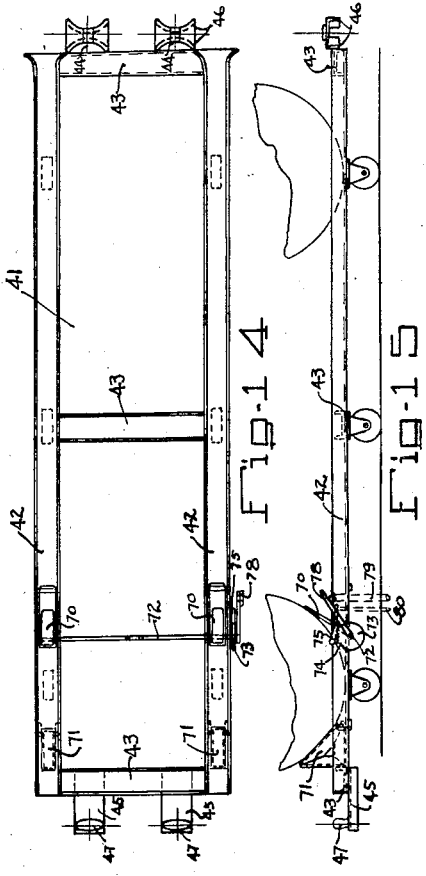
INVENTOR.
Walter H. Ewend.
BY
ATTORNEY.

Patented July 30, 1935

2,009,579

UNITED STATES PATENT OFFICE 2,009,579

VEHICLE STORAGE DEVICE

Walter H. Ewend, Oak Park, Ill.

Application November 5, 1930, Serial No. 493,514
Renewed December 19, 1934

10 Claims. (Cl. 214—16.1)

This invention relates to improvements in garaging or more particularly to a means or method of placing and storing automobiles and the like.

The use of my invention greatly facilitates the storage of vehicles and effects a great economy in space which is particularly valuable in congested urban centers. Individual vehicles may be placed in storage and removed therefrom with the minimum of disturbance to other vehicles and without danger of injury and any car in the entire storage system is readily available.

The objects of the invention are particularly to provide a garaging or storage system wherein cars are readily stored, readily and easily removed from storage, one wherein handling of the cars is substantially automatic in operation whereby human supervision is dispensed with to the greatest possible degree and wherein dead space or maneuvering space is substantially dispensed with.

Further objects of my invention are to provide a system wherein all the elements thereof are at all times under definite control and wherein for the purpose of speeding up, particularly in the delivery of cars therefrom, operation is accomplished both in forward and reverse directions with equal facility.

Whereas in the drawings there is illustrated but a portion of one storage unit it is to be understood that the invention contemplates the use of these units in any desired length, a plurality of the units side by side on a floor and a plurality of superposed floors each occupied by a plurality of units.

Additional and further objects of my invention and advantages thereof will become apparent on consideration of the accompanying drawings disclosing the preferred construction, when viewed in the light of the following detailed description of the invention.

In the drawings:—

Figure 1 is a plan view of a portion of the storage system.

Figure 2 is a side elevation of the structure shown in Figure 1.

Figure 3 is a plan view of a continuation of the structure shown in Figure 1.

Figure 4 is a side elevation of the structure shown in Figure 3.

Figure 5 is an enlarged detail of Figure 1.

Figure 6 is an enlarged detail elevation of the pusher dog release and reset.

Figure 7 is a view in elevation of the structure shown in Figure 6 but turned through 90°.

Figure 8 is a plan detail of the conveyor truck connectors.

Figure 9 is a side elevation of the structure shown in Figure 8.

Figure 10 is a diagrammatic elevation of a wheel block and

Figure 11 is a section through the main pusher conveyor chain showing the guides therefor.

Figure 12 is a plan view of a complete storage unit.

Figure 13 is a side elevation of Figure 12.

Figure 14 is a plan view of a truck and

Figure 15 is a side elevation of a truck.

The automobile storage system disclosed in this application comprising a quite large structure involving considerable detail has been stripped so far as possible of all minor devices and parts in order that the illustrations may be clear and understandable.

The storage system comprises in it barest essentials substantially parallel elongated guideways having across the ends thereof transverse conveyors for transferring vehicles from one of the elongated guideways or as they will be referred to, the truck guideways, are designated in sets identified by numerals 20—20 and 21—21 respectively.

The truck guideways are preferably channel sections laid on and secured to floor 22 on which they are laid but if desired they may comprise spaced angle sections or the guideways may be elevated above the floor on pedestals or other variations suggested by the conditions of use may be availed of.

Across the end of the two pairs of truck guideways 20—20, 21—21 there is provided an endless conveyor for transferring a vehicle from guideways 20 to guideways 21 which endless transverse conveyor comprises a plurality of endless conveyor chains or belts, illustrated by endless transverse conveyor chain 23 which is carried on and driven by sprockets 24. A plurality of parallel sets of conveyor chains 23 and sprockets make up the transverse conveyor, the drawings indicating three such sets but wherein the two end chains have not been illustrated for the sake of clearness.

The end transverse conveyor is operated from the sprockets 24 which are mounted on transverse conveyor shafts 25 and since all the sprockets 24 are all mounted on and driven from shafts 25 it follows that the several conveyor chains will be uniformly driven. Channels 26 are appropriately secured to transverse conveyor chains 23 and serve to receive and guide trucks from guideways 20 and 21. A plurality of pairs of channels 26 are secured on the transverse conveyor and pairs thereof are so positioned that as one pair advance from registry with guideways 20 into registry with guideways 21 another pair position opposite guideways 21, or if the transverse conveyor is operated in the opposite direction, then in reversed relation.

The transverse conveyor shafts 25 are rotated by rotation of sprockets 27 mounted thereon which are operated by chain 28 which in turn is actuated from the main pusher conveyor chain 29.

On the conveyor drive chain there are secured a plurality of spaced driving blocks 30 spaced apart a distance equal to the center line to center line spacing of the truck guideways 20 and 21 so that for each step advancement of the transverse conveyor there will be positioned a succeeding driving block 30 for engagement by pusher element 31 which is carried on main pusher conveyor chain 29.

The operation of the system so far as has been described is that motion of main pusher conveyor 29 is transmitted through pusher element 31 to driving blocks 30 secured on transverse conveyor drive chain 28. The motion imparted to chain 28 is transmitted through the conveyor drive sprockets 27 to conveyor shafts 25 to cause rotation thereof, thereby driving transverse conveyor chains 23 thru their sprockets 27 mounted on shaft 25.

For the operation of the entire system there is provided a prime mover, not shown, from which is driven an element of a caterpillar drive comprising principally chains 32—32 and 33 running on appropriate sprockets mounted on shafts 34—34 and 35—35. A sprocket on each of shafts 34—34 and 35—35 is in the horizontal plane of the main pusher chain which is to be driven and chains running on these sprockets are parallel and closely adjacent the main pusher chain 29 whereby by means of driving lugs on chains 32, main chain 29 may be driven. Connecting chain 33 runs on sprockets mounted on shafts 35—35 which sprockets are in a horizontal plane slightly below the before mentioned sprockets as will be evident in order that chain 33 may pass freely under guideways 21 and main chain 29. The drive is such that the prime mover simultaneously drives the parallel main runs of main pusher chain 29 in opposite directions and through equal distances. Since any drive which will cause relative motion of the opposite side runs of main pusher chain as just described may be substituted for the drive particularly described it is to be understood that any appropriate substitution may be made.

Main pusher chain 29 is illustrated as comprising that type of conveyor chain ordinarily referred to as rivetless or keylock conveyor chain, the construction of which is such that not only can the chain be diverted in the plane at right angles to the axis of its pins but in addition it can be diverted from a straight line path in a plane at right angles thereto. A link of the chain is shown in Figure 6 at 36, the side plates at 37 and a pin at 38. Chain 29 may comprise any type divertible in two planes at right angles one to another but that type particularly described is particularly suitable, or in fact, it is possible to utilize a chain divertible in only one plane by operating the chain entirely below the plane of truck guideways 20 and 21.

Main pusher conveyor chain 29 operates midway of each pair of truck guideways 20 and 21 and through the main portion of its longitudinal run operates in a plane substantially that of the truck guideways. Chain 29 is guided by and supported on guides 39, being maintained in operative relation therewith by slipper shoes 40. Between points A and B chain 29 is positioned substantially centrally of and in the plane of truck guideways 20. At B chain 29 is deflected downwardly until it is down far enough to operate the lower run of conveyor drive chain 28 as clearly shown in Figure 5 which position is reached at point C. At D the chain is deflected angularly to pass around a sprocket at E whereupon it is again deflected to make a pass across the system at right angles to its longitudinal path to sprocket F. From F the chain returns to the other side of the system, passes around sprockets at G H and I whereby it enters its longitudinal path substantially between guideways 21 but below the plane thereof.

At J the chain is deflected upwardly to the point K where it is again substantially in the plane of guideways 21 in which relation it continues until it reaches point L where it is again deflected downwardly to take a path complementary to that just described, relative to the other end of the system. Figure 1 reversed end for end and considered as a prolongation from the right hand end of Figure 2 clearly represents the unillustrated end of the system.

The side guideways 20 and 21 may be of any length which is a multiple of the length of trucks 41 which are operated thereon and it is to be understood that whereas the main pusher conveyor is shown as arranged centrally of guideways 20—20 and 21—21 that the chain 29 may be arranged outside of or between the pairs of guideways, that it may be completely below the guideways and that the end cross conveyors may be operated therefrom by appropriate means other than that illustrated.

Trucks 41 comprise essentially a rectangular frame made up of channel side members and cross members 43. The side channels 42 are spaced apart the distance of the usual automobile tread dimension and are adapted to receive an automobile thereon. At the opposite ends of each truck there are provided the complementing parts 44 and 45 of a coupling wherein the outwardly extending wings 46 of the female member and elliptical shape of the male member engaging therewith compensate for appreciable misalignment of the trucks in the cycle of operation.

In order that the system may be operated from a single endless pusher conveyor to accomplish the desired cycle of operations means are provided to accomplish automatic and timed driving engagement of the main pusher conveyor 29, with the trucks 41 and the end transverse conveyor mechanisms. The means provided for properly timing the action of the various parts of the system are constructed and positioned so that they function properly irrespective of the direction in which main pusher chain is operated whereby by selective direction of operation of the main pusher chain a unit may be brought to any desired position from that direction in which its path to the desired point is shorter.

The selective and automatic connecting and disconnecting means comprise the pusher elements which have been generally indicated at 31 wherein opposed pusher dogs 47 are pivoted on pins 48 mounted on brackets 49 in turn mounted on main pusher conveyor 29. Brackets 49 are merely upward extensions on members which are constructed generally the same as main pusher chain slipper shoes 40. Flanges 50 of slipper shoes ride on the top and bottom of main chain guides 39 and thereby restrain the main chain to travel within and be directed by the guides 39.

Pusher dogs 47 comprise pivoted levers pivoting on pivots 48, having at one end pusher heads 51 and on the other end operating members shown as wheels 52.

Pusher elements 31 are inoperative throughout the major portion of the traverse of main pusher chain 29 and are caused to be operative or inoperative selectively by coaction with the main chain guides 39 and particularly through the instrumentality of portions thereof constructed in a particular manner.

At predetermined points along main chain guides 39 the upper flanges are removed from the channel members comprising the guides and there are positioned adjacent the guides 39 other members 53 having a face adapted to serve in the stead of the removed upper flange portions of main guides 39. Members 53 shown as channel members are mounted on plate 54 on which are shown cam members 55 having camfaces whereby on actuation of pull rod 56 the levers 57 attached thereto turn on their pivots 58 whereby cam rollers 59 are moved to allow members 53 to lower out of operative position.

Guides not shown are provided for guiding members 53 in their vertical movement and whereas a specific means for causing the vertical motion has been shown it is to be understood that such showing is illustrative only and that other various suitable means for accomplishing the same result may readily be substituted therefor.

In operation of main pusher chain 29 in the direction of the arrows, Figure 6, it will be seen that dog 47 is in position to and is pushing member 43, which is the center cross bar of a truck 41. When the position of the figure is reached pull rod 56 is operated to rock levers 57 on their pivots moving cam rollers 59 to allow members 53 to drop down so that their upper faces are no longer in the plane of the upper faces of the main chain guides 39. As members 53 are lowered the pushing dog 47, the one to the left, rocks on its pivot since its dog operating members 52 are no longer supported.

The opposing dog 47, that to the right, would swing freely on its pivot 48 upon lowering of members 53 but it is restrained from so doing by a projecting pin 60 which is supported on a lifting cam 61. On further motion of main pusher chain 29 from left to right the left hand dog swinging freely on its pivot will have its lower end raised and upper end correspondingly depressed, through the coaction of its pin 60 with the rising cam 61. As pin 60 approaches the end of cam 61 its corresponding dog operating wheel 52 is raised sufficiently to clear the rise in dog wheel guide 62 and wheel 52 is delivered from dog raising cam 61 to the upper flat part of dog guide 62 with the dog in substantially horizontal and inoperative position. The left hand dog swings freely after passing under cross member 43 until members 53 are raised or its wheel 52 encounters dog guide 62 whereupon as it rides up the incline thereof it turns into horizontal position as its wheel 52 rises thereon.

From the position just described the dog element on further motion of main chain 29 continues in inoperative condition so long as dog wheel guide 62 is continued. As dogs 47 approach inoperative position means are provided for restoring members 53 to their raised position by moving pull rod 56 with its associated levers 57 back to its former position whereby cams 55 are raised and consequently members 53 are restored to their former positions.

Elevation of members 53 is accomplished by cooperative action of lugs 63, on the lower face of flange 50 of the slipper shoe 40 which carries the dog, with a cam operating mechanism on the right hand end of pull rod 56. The cam operating mechanism comprises essentially top guide 64, bottom guide 65, a lever 66 pivoted at 67 and a counterweight 68 pivoted at 69.

With cam pull rod 56 in its left hand position, members 53 lowered and main conveyor chain moving from left to right the resetting action is as follows. Lug 63 contacts the upper end of lever 66 and pushes it to the right. The lever 66 is restrained from pivoting by the coaction of its lower face and its pivot pin 67 with the lower and upper guides respectively and consequently lever 66 is translated to the right returning cam operating lever 56 to raise members 53.

As lever 66 approaches its extreme right hand position its lower face leaves lower guide 65 and the lever turns on its pivot 67 and allows lug 63 to pass and likewise allows any succeeding lugs to pass. A pivoted counterweight 68 pivoted at 69 is provided which serves to return lever 66 to its position, as shown, after it has been caused to pivot. The counterweight by returning lever 66 to the position shown prevents any possibility of lever 66 staying in turned down position and locking cam pull rod from subsequent operation.

In reverse operation of main chain 29 lugs 63 tilt lever 66 on its pivot and freely pass by, left hand dog wheel 52 rides freely down the incline of dog wheel guide 62 and the dog pivots to pass freely under cross member 43. As the right hand dog 47 approaches dog raising cam 61, pin 60 engages thereon and rides down its sloping face and as it approaches its left hand end is in operative position to contact and push cross member 43 of a truck 41.

When operating main pusher chain 29 in reverse direction a dog release mechanism must be provided at the other or reverse end of the active run which mechanism is exactly like that of Figures 6 and 7, just described, the only precaution of installation being that the mechanism be reversed or turned 180°.

The mechanical details and operation of the various mechanisms of the system having been described the general operation thereof will now be pointed out.

The complete system filled with trucks 41, excepting for two diagonally opposite end corner spaces operates to transport the trucks around the system in the following manner. Truck 41 is in position to be and is engaged by a dog element 31 at W. Guideways 20 have thereon a solid line of trucks connected by coupling members 44, 45 which fills it completely except for one space on the transfer conveyor. Guideways 21 have thereon a line of connected trucks of the same number as on guideways 20 but they are displaced one truck length to the left thereof to fill a space on the transfer conveyor and to leave a vacant space on the transfer conveyor, not shown, at the other end of the system. On guideways 21 a truck is in position to be and is operatively engaged by a dog element 31 at X.

The dog elements 31, as shown are uniformly spaced on main chain 29 just slightly over one and one half truck lengths apart and in all events must be spaced at least a truck length plus the distance which a dog element must move to effect a cross transfer on a cross conveyor.

With the system in the condition as has been described the main conveyor chain 29 is operated in the direction of the arrows, Figures 1 and 3. Dog elements at W and X in operative contact with truck center cross members 43 advance with main chain 29, in opposite relative directions between guideways 20 and 21 and correspondingly advance each line of connected trucks oppositely. Main conveyor chain 29 is actuated one truck length, to advance thru dog elements 31, each of the lines of trucks for one truck length. The operation just described has moved a truck from each diagonal corner which was occupied and has positioned a truck on each of the previously unoccupied corner spaces.

A dog release and reset mechanism as shown in Figures 6 and 7 is positioned at each of points Y and Z, that at Y being in reverse position relative to the showing in Figure 6 while that at Z is in position as shown in Figure 6.

As pusher dog elements 31 from positions W and X approach positions Y and Z main chain 29 slows down and nearly or completely stops as the dog elements reach positions Y and Z. At this instant the dog release pull rods 56 are actuated to drop the dog release members 53 whereby dogs 47 release cross member 43.

Main conveyor chain 29 is again advanced and dogs 47 pass into inoperative position and dog release members 53 are restored to initial position as has been described. A dog element 31 which has been advanced, by the previous movement of main chain 29, to a little past point E where the dog element picks up a drive block 30 on transverse conveyor drive chain 28 and as it advances toward F the transverse conveyor uncouples a truck from one line, advances it and couples it to the other line. As the dog element approaches the end of its cross transfer operation the main chain 29 slows down or stops and a dog release adjacent F causes release of block 30 as described for positions Y and Z. Operation of the cross conveyor at the other end of the system is simultaneous with and the same as just described except that the entire mechanism and motion is displaced at 180°.

In the operation of the system in the direction opposite to that indicated by the arrows and from the position shown, the first movement of the cycle will be the return of the trucks, on the cross conveyors to their immediately preceding positions. The dog unit 31 adjacent F will, through engagement with a driving block 30 on chain 28, actuate the chain and correspondingly operate the transverse conveyors to move a truck from opposite guideways 21 to opposite guideways 20. As the trucks approach the end of their cross traverse and stop, the driving dogs have approached adjacent points E where there is a dog release which is reversed relative to the one adjacent F and which dog release is actuated, as the chain stops, to release the dogs which have just acted to operate the cross conveyor.

The dog units shown nearest the left and right hand ends in Figure 3 will have advanced to approximately positions Y and Z respectively where center cross members 43 of trucks 41 are engaged. On further operation of main chain 29 the dogs 31 which have just engaged advance the trucks on their respective guideways to advance the lines of trucks a truck length or until the operative dogs reach W and X at which points there are positioned dog releases such as have been previously fully described.

Regardless of where any particular truck 41 may be positioned on the guideways, it will be seen that it may readily be transferred step by step to any desired position by a plurality of cycles of the mechanism as has been described and that it may move around the circuit in either direction whichever is the shorter distance to the point at which the truck is to be positioned.

It is of course to be understood that the drive is actuated by a prime mover driving one of the drive shafts, preferably one of the shafts 35. The prime mover of course needs necessarily be operated directly or indirectly, as thru an interposed clutch member, cyclicly; that is, to operate in a recurrent series of relatively long and short operating periods, the longer periods of operation being required for longitudinal advancement whereas the shorter periods are those required for transverse advancement of a truck 41.

The prime mover, preferably an electric motor, is furnished with a control which basically is old and is readily available, that is a control which starts the motor to quickly accelerate the load and bring the motor up to full speed and thereafter, responsive either to time or a contact made as a truck approaches the end of its movement, acts to stop the motor and apply brakes. Dog release pull rods 56 are preferably controlled by the main motor control and may conveniently be connected to be actuated either mechanically or electrically by or from the motor control device.

Whereas it has been stated that dog release pull rods are actuated as the main conveyor stops or substantially stops it is understood that if the dog release is actuated as the system comes to a stop that the motor control shall, prior to initiation of motion in the opposite direction, be actuated sufficiently in its last direction of operation to cause the dog release reset device to reset the dog release whereupon the system reverses and takes up the desired motion. As alternative of the steps of operation just described means may be provided for electrically or mechanically resetting the dog release elements as the initial act in reversing the system. If the control is such that the system only substantially comes to a stop at the dog release elements, then in overrunning these elements the reset mechanism illustrated resets the releases and at the termination of any cycle of advancement of the trucks the direction of motion of the system may be reversed.

In the drawings there is indicated at 90, an elevator or other means for bringing up an automobile which is to be placed on the system and from which it may be run onto a truck 41. At one end of truck 41, the end opposite to that at which the automobile is received there is provided a stop member 71 which serves as a barrier in front of a wheel to prevent the car running off the truck. Stop 71 may be provided by turning up the ends of the side channels 42 of trucks 41 or may comprise separate members secured thereon as is evident. Means to be described are provided to cooperate with stops 71 to secure a car on a truck 41.

The means provided for cooperating with stops 71 comprises primarily a leaf stop member 70 pivoted in truck side channel 42 and spaced from stop 71 at a distance therefrom slightly greater than the radius of the largest wheel designed to be accommodated. Leaf stop 70 is secured on, and pivots with shaft 72 on which is mounted ratchet wheel member 73 having ratchet teeth over a portion of its peripheral face which ratchet teeth are shown at 74. A pawl 75 having a pawl tooth 76 and pivoted at 77 cooperates with ratchet teeth 74 to maintain member 73 in any desired position. There is also mounted on shaft 72 operating lever 78 which is connected to move stop leaf 70 and ratchet wheel 73 and is adapted in turn to be actuated by push rod 79. A release rod 80 is provided to raise pawl lever 75 to rock it on its pivot and release pawl tooth 76 from ratchet teeth 74.

With leaf stop 70 in horizontal position a car is run on truck 41 until its wheels contact end stop 71 whereupon push rod 79 is actuated as by a torque motor, to pivot on shaft 72 and likewise cause ratchet wheel 73 and leaf stop 70 to pivot. Pawl tooth 76 rides over the ratchet teeth until leaf 71 comes up against the wheel and further pivotal movement prevented whereupon pawl tooth 76 cooperating with a ratchet tooth 74 prevents return motion of the leaf stop. When it is desired to release a car from the truck it is only necessary to raise rod 80 to raise pawl lever 75 which releases pawl tooth 76 from ratchet tooth 74 whereupon leaf stop 70 returns to the horizontal.

Whereas there has been disclosed in the drawings and described in the specification a preferred embodiment of the invention it is to be understood that the illustrations are general and diagrammatic and that the principles of the invention thereof are capable of embodiment in various modifications, equivalents and adaptations which will readily suggest themselves to those skilled in the art to which the invention appertains.

What is claimed is:—

1. Storage apparatus for vehicles including a plurality of vehicle movers arranged in a closed rectangular circuit in a horizontal plane with parallel adjacent sides occupying a unit of storage space, said vehicle movers substantially filling said circuit with the exception of two vacant spaces at diagonally opposite corners; means comprising an endless propelling conveyor for moving the movers around said circuit a plurality of substantially equally spaced driving means on said endless propelling conveyor, a cross conveyor across each end of the unit, a transmission drive between the endless conveyors and cross conveyors, the driving means on the endless propelling conveyor adapted to, through the transmission drives, operate the cross conveyors in opposite directions to move the end movers in opposite directions transversely from one side of the circuit to the other to fill said vacant spaces at the corners and leave two other vacant spaces at the other corners, said driving means on said endless propelling conveyor adapted to contact movers on the side lines to advance the lines of movers at the two sides of said circuit to fill said last vacant spaces and leave other vacant spaces and repeating seriatim.

2. In the structure defined in claim 1 wherein the endless propelling conveyor is operable in forward and reverse directions selectively.

3. Storage apparatus for vehicles including a plurality of adjacent substantial parallel elongated vehicle receiving guide-ways, a transverse conveyor across each end of the adjacent side guide-ways, and an endless drive means operative to alternately and step by step advance vehicles in opposite directions on the parallel side guideways and transmission drives positioned between the endless drive means and the end cross conveyors to operate the end cross conveyors in opposite directions.

4. The structure as described in claim 3 wherein the endless drive means propelling vehicles around the circuit comprise an endless propelling conveyor having driving members thereon serving to propell vehicles on the side guide-ways and to propell the end cross conveyors.

5. The structure defined in claim 3 wherein the endless drive means is substantially deflected in two planes at approximately right angles one to the other.

6. The structure defined in claim 3 wherein the endless drive means is substantially deflected in two planes at approximately right angles one to the other, a driven member operated from the endless propelling conveyor and operatively connecting to drive the cross conveyor.

7. In a vehicle storage device an endless pusher conveyor arranged to operate in a rectangular effective path, a portion of the side runs thereof operating in a substantially horizontal plane, other portions of the side runs and the transverse end runs thereof deflected to and operating in a plane vertically displaced from the first mentioned plane of operation.

8. In a conveying system a driving means, driving dogs on the driving means and guide members maintaining the driving dogs in driving position, dog release devices associated with the guide members and operative to release, selectively, the driving dogs from driving position to inoperative position, wherein the driving dogs comprise pivoted members, and wherein portions of the guideways are movable to release the driving dogs from driving position, there being provided restoring actuators associated with the driving dogs to restore the dog release from active to inactive position.

9. In a vehicle storage device, parallel side guideways, transverse end conveyors across the ends of the side guideways, a row of end connected vehicles filling the side guideways and end conveyors excepting at diagonally opposite corners, endless power means having mounted thereon driving members, means causing a driving member to engage a vehicle on each of the side guideways to advance each row of vehicles one vehicle length, the rows advanced in opposite directions, means causing the vehicle engaging member to then disengage, means causing a vehicle engaging member to subsequently connect said endless power means, in driving relation to an end conveyor to advance said end conveyor transversely one step and means then disengaging said member therefrom.

10. In a vehicle storage system, means and mechanisms comprising a closed conveying system, vehicles on the conveying system to be conveyed around said closed system, an endless drive means extending in a closed circuit around the system and having thereon driving members adapted to, through a portion of the system, contact and advance vehicles around said system by a plurality of step by step movements and releasing devices to release the driving members from their driving relation to the vehicles at the termination of each step of advancement of vehicles in the system and as a portion of the system endless conveyors adapted to receive and transport the vehicles; transmission drives positioned between the endless drive means and the endless conveyors and driven by the driving members on the endless drive means to in turn drive the endless conveyors in coacting step by step movements.

WALTER H. EWEND.